(12) United States Patent
Pitera et al.

(10) Patent No.: US 11,600,882 B1
(45) Date of Patent: Mar. 7, 2023

(54) THIN BATTERY PACK ARCHITECTURE

(71) Applicant: Apple Inc., Cupertino, CA (US)

(72) Inventors: Dominic Pitera, San Francisco, CA (US); Nathan J. Bohney, Campbell, CA (US); Andrew S. Meyers, Villa Park, CA (US)

(73) Assignee: Apple Inc., Cupertino, CA (US)

( * ) Notice: Subject to any disclaimer, the term of this patent is extended or adjusted under 35 U.S.C. 154(b) by 243 days.

(21) Appl. No.: 17/026,499

(22) Filed: Sep. 21, 2020

Related U.S. Application Data

(60) Provisional application No. 62/902,570, filed on Sep. 19, 2019.

(51) Int. Cl.
*H01M 50/209* (2021.01)
*H01M 10/42* (2006.01)
*H01M 50/543* (2021.01)
*H01M 10/04* (2006.01)
*H01M 10/0585* (2010.01)
*H01M 50/287* (2021.01)

(52) U.S. Cl.
CPC ..... *H01M 50/209* (2021.01); *H01M 10/0436* (2013.01); *H01M 10/0585* (2013.01); *H01M 10/425* (2013.01); *H01M 50/543* (2021.01); *H01M 50/287* (2021.01); *H01M 2220/30* (2013.01)

(58) Field of Classification Search
None
See application file for complete search history.

(56) References Cited

U.S. PATENT DOCUMENTS

| | | | |
|---|---|---|---|
| 2014/0011070 A1* | 1/2014 | Kim | H01M 50/10 29/623.2 |
| 2014/0050959 A1* | 2/2014 | Ryu | H01M 10/0431 429/246 |
| 2016/0268650 A1* | 9/2016 | Heo | H01M 50/209 |

* cited by examiner

*Primary Examiner* — Carmen V Lyles-Irving
(74) *Attorney, Agent, or Firm* — Kilpatrick Townsend & Stockton

(57) ABSTRACT

Battery systems according to embodiments of the present technology may include a battery characterized by a first surface, a second surface, and a third surface. A recessed ledge may be defined by the third surface about a midpoint of the battery. The first surface and the third surface may define a first terrace formed proximate a first lateral edge of the first surface of the battery adjacent the third surface of the battery, and a second terrace formed proximate a second lateral edge of the first surface of the battery adjacent the third surface of the battery and opposite the first lateral edge. The recessed ledge may extend along the first surface of the battery between the first terrace and the second terrace. The battery systems may also include a module seated on the first surface of the battery between the first terrace and the second terrace.

14 Claims, 5 Drawing Sheets

THIN BATTERY PACK ARCHITECTURE

CROSS-REFERENCES TO RELATED APPLICATIONS

The present application claims the benefit of and priority to U.S. Provisional Application No. 62/902,570, filed Sep. 19, 2019, the contents of which are hereby incorporated by reference in their entirety for all purposes.

TECHNICAL FIELD

The present technology relates to battery systems. More specifically, the present technology relates to battery component configurations incorporating a module with a battery.

BACKGROUND

Batteries are used in many devices. As devices in which batteries are housed reduce in size, the available space for battery cells and associated system materials may limit placement options.

SUMMARY

Battery systems according to embodiments of the present technology may include a battery characterized by a first surface, a second surface opposite the first surface, and a third surface extending between the first surface and the second surface and at least partially defining a thickness of the battery between the first surface and the second surface. A recessed ledge may be defined by the third surface about a midpoint of the battery. The first surface and the third surface may define a first terrace formed proximate a first lateral edge of the first surface of the battery adjacent the third surface of the battery, and a second terrace formed proximate a second lateral edge of the first surface of the battery adjacent the third surface of the battery and opposite the first lateral edge. The recessed ledge may extend along the first surface of the battery between the first terrace and the second terrace. The battery systems may also include a module seated on the first surface of the battery between the first terrace and the second terrace.

In some embodiments, the first terrace and the second terrace may be defined along the third surface of the battery to a thickness from the second surface of the battery less than the thickness of the battery between the first surface of the battery and the second surface of the battery defining an internal volume of the battery within which a battery cell may be disposed. A first electrode terminal may be accessible from the first surface of the battery along the first terrace, and a second electrode terminal may be accessible from the first surface of the battery along the second terrace. The first electrode terminal may extend from the first surface of the battery in a direction normal to the first surface of the battery. A spacer may extend about the first electrode terminal and electrically isolate the first electrode terminal from a housing of the battery. The module may include electrical connections to the module proximate a midpoint of the module. The module may extend laterally beyond an edge of the second surface of the battery proximate the midpoint of the module.

The module may include a first conductive tab extending from a first lateral edge of the module proximate the first terrace. The first conductive tab may extend laterally outward across the first terrace of the battery at a lateral end of the first conductive tab. The module may include a second conductive tab extending from a second lateral edge of the module opposite the first lateral edge of the module and proximate the second terrace. The second conductive tab may extend laterally outward across the second terrace of the battery at a lateral end of the second conductive tab. The lateral end of the first conductive tab may be offset from the lateral end of the second conductive tab in a direction parallel to the third surface of the battery. The battery system may include a first insulative tape extending across the first conductive tab and may include a second insulative tape extending across the second conductive tab.

The module may include a circuit board. The module may be seated against the first surface of the battery proximate a first surface of the circuit board. At least one electronic device may extend from a second surface of the circuit board opposite the first surface of the circuit board. The module may also include an overmold at least partially extending across the second surface of the circuit board and encapsulating the at least one electronic device. The battery systems may also include a first spacer at least partially extending across the first terrace. The battery systems may include a second spacer at least partially extending across the second terrace. The first spacer, the second spacer, and the overmold may extend to a similar thickness along the third surface of the battery less than or equal to the thickness of the battery between the first surface of the battery and the second surface of the battery. The battery systems may include a second insulative tape extending across the first spacer, the second spacer, and the overmold of the module. The second insulative tape may be folded about the module, and the second insulative tape may be adhesively coupled along the second surface of the battery.

Some embodiments of the present technology may encompass battery systems. The systems may include a battery including a lid, and the lid may define lateral dimensions of the battery. The systems may include a base, and the base may define an internal volume of the battery between an interior surface of the lid and an interior surface of the base. The base may be coupled with the lid to define a flange extending about lateral edges of the battery. The base may define a tiered profile along an exterior surface of the battery towards a first lateral edge of the battery. The tiered profile may include a first tier defining a depth of the battery. The tiered profile may include a second tier defining a first terrace proximate the flange along an intersection of the first lateral edge of the battery and a second lateral edge of the battery. The second tier may further define a second terrace proximate the flange along an intersection of the first lateral edge of the battery and a third lateral edge of the battery opposite the second lateral edge of the battery. The tiered profile may include a third tier extending inward from the first lateral edge of the battery and extending between the first terrace and the second terrace. The tiered profile may include a module seated on the exterior surface of the base of the battery along the third tier, and between the first terrace and the second terrace.

In some embodiments a first recessed ledge may be defined between the first tier and the second tier. A second recessed ledge may be defined between the second tier and the third tier. A first electrode terminal may be accessible through the base of the battery along the first terrace, and a second electrode terminal may be accessible through the base of the battery along the second terrace. The first electrode terminal may extend through the base of the battery in a direction normal to the exterior surface of the battery along the first terrace. A spacer may extend about the first electrode terminal and electrically isolate the first electrode terminal from the base of the battery. The module may include electrical connections to the module proximate a midpoint of the module, and the module may extend laterally beyond an edge of the lid of the battery proximate the midpoint of the module. The module may include a circuit board. The module may be seated against the exterior surface of the base of the battery proximate a first surface of the circuit board. At least one electronic device may extend from a second surface of the circuit board opposite the first surface of the circuit board. The module may also include an overmold at least partially extending across the second surface of the circuit board and encapsulating the at least one electronic device.

Such technology may provide numerous benefits over conventional technology. For example, the present systems may provide a compact positioning of battery system components with a battery. Additionally, the battery system components may be positioned to accommodate a defined volume and geometry of a battery. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Figure 1:
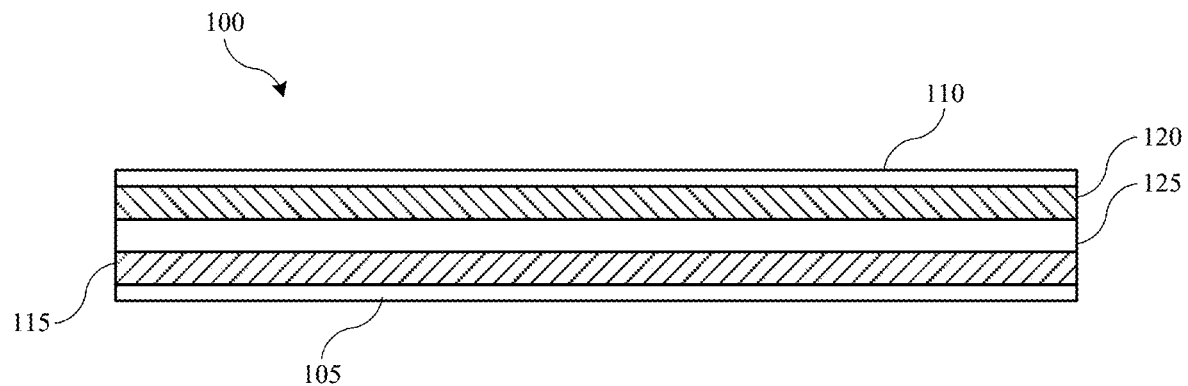
FIG. 1 shows a schematic cross-sectional view of a battery cell according to some embodiments of the present technology.

Several of the figures are included as schematics. It is to be understood that the figures are for illustrative purposes, and are not to be considered of scale or proportion unless specifically stated to be of scale or proportion. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, battery cells, and more generally energy storage devices, are used in a host of different systems. In many devices, the battery cells may be designed with a balance of characteristics in mind. For example, including larger batteries may provide increased usage between charges, however, the larger batteries may require larger housing, or increased space within the device. As device designs and configurations change, especially in efforts to reduce device sizes, the available space for additional battery system components may be constrained. These constraints may include restrictions in available volume as well as the geometry of such a volume. Conventional devices have often been restricted to larger form factors to accommodate both a sufficient battery as well as associated battery system components. The present technology may overcome these issues, however, by providing a configuration by which battery control system components may be confined to a volume accommodating the battery or a battery system in one or more ways. After illustrating an exemplary cell that may be used in embodiments of the present technology, the present disclosure will describe battery system designs having a controlled form factor for use in a variety of devices in which battery cells may be used.

Although the remaining portions of the description will reference lithium-ion batteries, it will be readily understood by the skilled artisan that the technology is not so limited. The present techniques may be employed with any number of battery or energy storage devices, including other rechargeable and primary battery types, as well as secondary batteries, or electrochemical capacitors. Moreover, the present technology may be applicable to batteries and energy storage devices used in any number of technologies that may include, without limitation, phones and mobile devices, watches, glasses, bracelets, anklets, and other wearable technology including fitness devices, handheld electronic devices, laptops and other computers, as well as other devices that may benefit from the use of the variously described battery technology.

FIG. 1 depicts a schematic cross-sectional view of an energy storage device or battery cell 100 according to embodiments of the present technology. Battery cell 100 may be or include a battery cell, and may be one of a number of cells coupled together to form a battery structure that may be characterized by specific features facilitating incorporation in configurations described below. As would be readily understood, the layers are not shown at any particular scale, and are intended merely to show the possible layers of cell material of one or more cells that may be incorporated into an energy storage device. In some embodiments, as shown in FIG. 1, battery cell 100 includes a first current collector 105 and a second current collector 110. In embodiments one or both of the current collectors may include a metal or a non-metal material, such as a polymer or composite that may include a conductive material. The first current collector 105 and second current collector 110 may be different materials in embodiments. For example, in some embodiments the first current collector 105 may be a material selected based on the potential of an anode active material 115, and may be or include copper, stainless steel, or any other suitable metal, as well as a non-metal material including a polymer. The second current collector 110 may be a material selected based on the potential of a cathode active material 120, and may be or include aluminum, stainless steel, or other suitable metals, as well as a non-metal material including a polymer. In other words, the materials for the first and second current collectors can be selected based on electrochemical compatibility with the anode and cathode active materials used, and may be any material known to be compatible.

In some instances the metals or non-metals used in the first and second current collectors may be the same or different. The materials selected for the anode and cathode active materials may be any suitable battery materials operable in rechargeable as well as primary battery designs. For example, the anode active material 115 may be silicon, graphite, carbon, a tin alloy, lithium metal, a lithium-containing material, such as lithium titanium oxide (LTO), or other suitable materials that can form an anode in a battery cell. Additionally, for example, the cathode active material 120 may be a lithium-containing material. In some embodiments, the lithium-containing material may be a lithium metal oxide, such as lithium cobalt oxide, lithium manganese oxide, lithium nickel manganese cobalt oxide, lithium nickel cobalt aluminum oxide, or lithium titanate, while in other embodiments the lithium-containing material can be a lithium iron phosphate, or other suitable materials that can form a cathode in a battery cell.

The first and second current collectors as well as the active materials may have any suitable thickness. A separator 125 may be disposed between the electrodes, and may be a polymer film or a material that may allow lithium ions to pass through the structure while not otherwise conducting electricity. Active materials 115 and 120 may additionally include an amount of electrolyte in a completed cell configuration. The electrolyte may be a liquid including one or more salt compounds that have been dissolved in one or more solvents. The salt compounds may include lithium-containing salt compounds in embodiments, and may include one or more lithium salts including, for example, lithium compounds incorporating one or more halogen elements such as fluorine or chlorine, as well as other non-metal elements such as phosphorus, and semimetal elements including boron, for example.

In some embodiments, the salts may include any lithium-containing material that may be soluble in organic solvents. The solvents included with the lithium-containing salt may be organic solvents, and may include one or more carbonates. For example, the solvents may include one or more carbonates including propylene carbonate, ethylene carbonate, ethyl methyl carbonate, dimethyl carbonate, diethyl carbonate, and fluoroethylene carbonate. Combinations of solvents may be included, and may include for example, propylene carbonate and ethyl methyl carbonate as an exemplary combination. Any other solvent may be included that may enable dissolving the lithium-containing salt or salts as well as other electrolyte component, for example, or may provide useful ionic conductivities, such as greater than or about 5-10 mS/cm.

Although illustrated as single layers of electrode material, battery cell 100 may be any number of layers. Although the cell may be composed of one layer each of anode and cathode material as sheets, the layers may also be formed into a jelly roll design, or folded design, prismatic design, or any form such that any number of layers may be included in battery cell 100. For embodiments that include multiple layers, tab portions of each anode current collector may be coupled together, as may be tab portions of each cathode current collector. Once the cell has been formed, a pouch, housing, or enclosure may be formed about the cell to contain electrolyte and other materials within the cell structure, as will be described below. Terminals may extend from the enclosure to allow electrical coupling of the cell for use in devices, including an anode and cathode terminal. The coupling may be directly connected with a load that may utilize the power, and in some embodiments the battery cell may be coupled with a control module that may monitor and control charging and discharging of the battery cell. FIG. 1 is included as an exemplary cell that may be incorporated in battery systems according to the present technology. It is to be understood, however, that any number of battery and battery cell designs and materials that may include charging and discharging capabilities similarly may be encompassed by the present technology.

Figure 2:
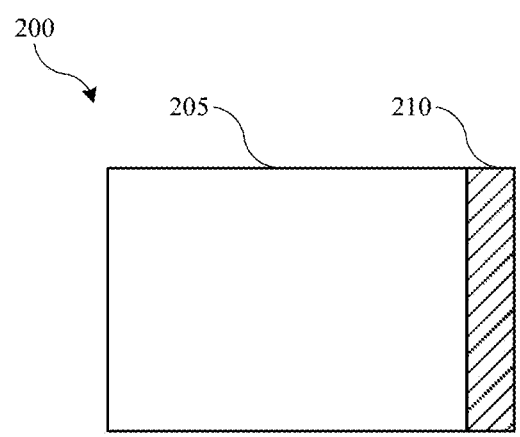
FIG. 2 shows a schematic plan view of a battery system according to some embodiments of the present technology.

FIG. 2 shows a schematic plan view of a battery system 200 according to some embodiments of the present technology. As illustrated, battery system 200 may include a battery cell or battery 205, which may include any number of battery cells, as well as a battery module 210. Battery module 210 may be electrically connected with battery 205 to provide a variety of functionality. For example, battery module 210 may monitor battery 205 during charging and discharging operations, and may ensure the battery is not overcharged or over-depleted during use. Additionally, battery module 210 may monitor overall health of the battery 205 to ensure proper functioning. Battery module 210 may couple with terminals of the battery, such as one or both of the positive and negative terminals, in order to provide this functionality.

Battery module 210 may also include an additional electrical connector, such as a coupling, that may allow device components to access the battery capacity through the battery module 210. In this way, battery module 210 may provide a pass-through functionality for delivering power from battery 205. Consequently, battery module 210 may be under constant load from the battery. Battery 205 may include a battery cell, which may be similar to battery cell 100 described above, and may include a pouch or enclosure to protect the battery cell from exposure to the environment. The housing may also operate to maintain electrolyte and other materials within the battery cell. To access the battery cell through this housing, one or more terminals or leads may extend through the housing. Some conventional designs may wrap the battery module 210 onto the terminals of battery 205, which may allow the provision of additional materials to protect terminals and conductive components from fluid contact. However, as device configurations continue to shrink, battery designs change, and manufacturing processes incorporate many more small scale operations with smaller and/or thinner materials, these types of incorporations may become less feasible or prone to causing damage. The present technology allows for an adjacent coupling of the battery module 210 onto terminals of the battery 205, which may further reduce the overall battery system envelope when incorporated within an electronic device.

Some electronic devices encompassed by the present technology may be characterized by volume or spacing constraints that create more oblong volumes to accommodate a battery. For example, some computers, handheld devices, and other electronic devices may be characterized by a battery volume within the device characterized by lateral dimensions, or length and width dimensions, which may be greater than depth dimensions, which may also be considered or termed thickness or height dimensions throughout the present technology. In some embodiments, these dimensions may differ by an order of magnitude or more. For example, some batteries encompassed by the present technology may be characterized by lateral dimensions greater than or about 5 cm, 10 cm, 20 cm, or more. However, the depth of these batteries may be maintained below or about 20 mm, 10 mm, 5 mm, 3 mm, 2 mm, 1 mm, or less. These constraints in height may also affect a battery power control module configured to couple with the battery and electronically couple the battery with additional electronics of the device.

Many conventional power modules to which a battery is coupled may be characterized by greater thickness dimensions, and may be incapable of being adopted to batteries according to some embodiments of the present technology. However, by utilizing available lateral space to accommodate module components, and adjusting battery configurations, the present technology may produce a battery system that maintains the module within a dimensional volume provided by the battery itself.

Figure 3:
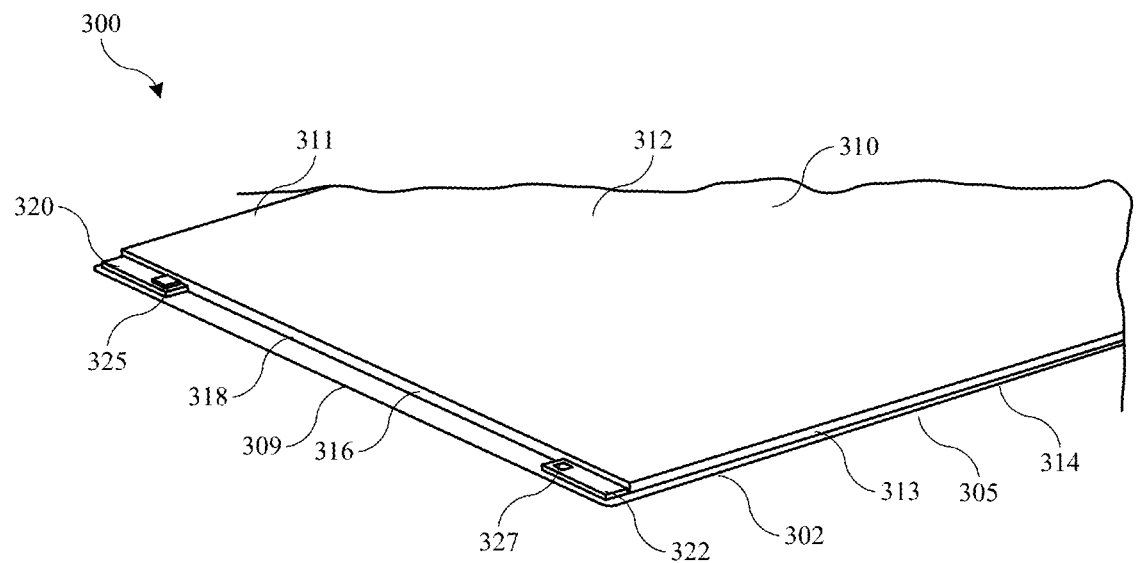
FIG. 3 shows a schematic, partial perspective view of a battery according to some embodiments of the present technology.

FIG. 3 shows a schematic, partial perspective view of a battery 300 according to some embodiments of the present technology. Battery 300 may include any of the components previously described, and may include a battery configured to support a module as will be described below. Battery 300 may include a battery cell as previously described in FIG. 1 shaped specifically for dimensions noted above, and may include one or more cells included within a pouch or packaging. For example, in some embodiments battery 300 may include a rigid housing, and may include a conductive housing. The conductive housing may be maintained at positive or negative potential in embodiments, and may be maintained at negative potential, which may then operate as a device ground, and be considered similar to a neutral connection. Additionally, by using a rigid housing instead of a flexible pouch, fabrication tolerances on the battery dimensions may be reduced, which may afford increased volume for the internal battery cells, which may provide increased capacity over conventional designs. The rigid housing or can may include a flange 302 extending about the battery, which may be a lid enclosure for the rest of the housing, and which may be or include a seamless or substantially seamless form providing an internal volume in which the battery cell or cells and electrolyte may be contained.

As noted, battery 300 may include a flange 302 formed about an exterior of battery 300, and which may join a lid 305 with a base 310. The flange may be formed by welding, adhering, or otherwise joining a lip of base 310 with lid 305. Accordingly, in some embodiments, lid 305 may define lateral dimensions of battery 300, and base 310 may define a depth profile of battery 300. Base 310 may provide an internal volume configured to house a battery cell or cells as previously described, which may be defined between interior surfaces of base 310 and lid 305. Exterior surfaces of the lid 305 and base 310 may define surfaces of the battery 300, where an exterior surface of base 310 may define a first surface 312 of battery 300, and an exterior surface of lid 305 may define a second surface 314 of the battery, which is opposite first surface 312, and would be understood as the underside of the image shown. Battery 300 may be oriented in any way, which may adjust terminology accordingly, and would be readily appreciated as similarly encompassed by the present technology.

First surface 312 may be a profiled surface that defines a number of features at different thicknesses or depths of the battery. As noted, battery 300 may include a second surface 314 from which flange 302 may extend, and the battery may include a third surface 316 defined between first surface 312 and second surface 314, which may at least partially define the thickness or depth of battery 300 in some embodiments. However, as previously noted, the housing of battery 300 may include a recessed can on which a lid is disposed, and thus in some embodiments first surface 312 and third surface 316 may be part of a continuous structure and may not have a discrete intersection. Similarly, flange 302 may be formed by material extending from the first surface as well as material defining the second surface, such as where first surface 312 may define a lip at an edge along which a lid, being the second surface, may be coupled. Regardless, the flange may extend in line with the second surface in embodiments.

First surface 312 and/or third surface 316 may define a recessed ledge 318 about a midpoint of battery 300, which may extend laterally towards lateral edges of first surface 312. Proximate lateral edge 311 and lateral edge 313 of first surface 312, such as where flange 302 may extend, first surface 312 and/or third surface 316 may define terraces on which electrode tabs may be accessed through the battery housing. For example, first surface 312 and/or third surface 316 may define a first terrace 320 formed proximate a first lateral edge 311 of the first surface 312 of the battery 300, and which may be adjacent or extending from third surface 316, such as partway along a length of third surface 316, or which may be a continuation of a profiled surface as noted for base 310. Similarly, first surface 312 and/or third surface 316 may define a second terrace 322 formed proximate a second lateral edge 313 of the first surface 312 of the battery 300, and which may be adjacent or extending from third surface 316, or which may be a continuation of a profiled surface as noted for base 310. In some embodiments first terrace 320 and second terrace 322 may be substantially coplanar, such as within manufacturing tolerances, to produce a symmetric profile across first surface 312, or base 310.

As illustrated, first terrace 320 and second terrace 322 may not extend fully along third surface 316, and recessed ledge 318 may extend along the first surface 312 of battery 300 between the first terrace 320 and the second terrace 322. First surface 312 of base 310, or a combination of first surface 312 and third surface 316, may also produce a tiered profile along the exterior surface of the battery towards a lateral edge 309, which may extend between lateral edges 311 and 313, and which may be further described below.

Battery 300 may include access to electrode terminals extending through base 310 in some embodiments, and which may be accessible along the terraces formed with first surface 312. The electrode terminals may include conductive pads which may be accessible through or along the terrace. In some embodiments, a first electrode terminal 325 may be accessible along first surface 312 on first terrace 320, and a second electrode terminal 327 may be accessible along first surface 312 on second terrace 322.

Figure 4:
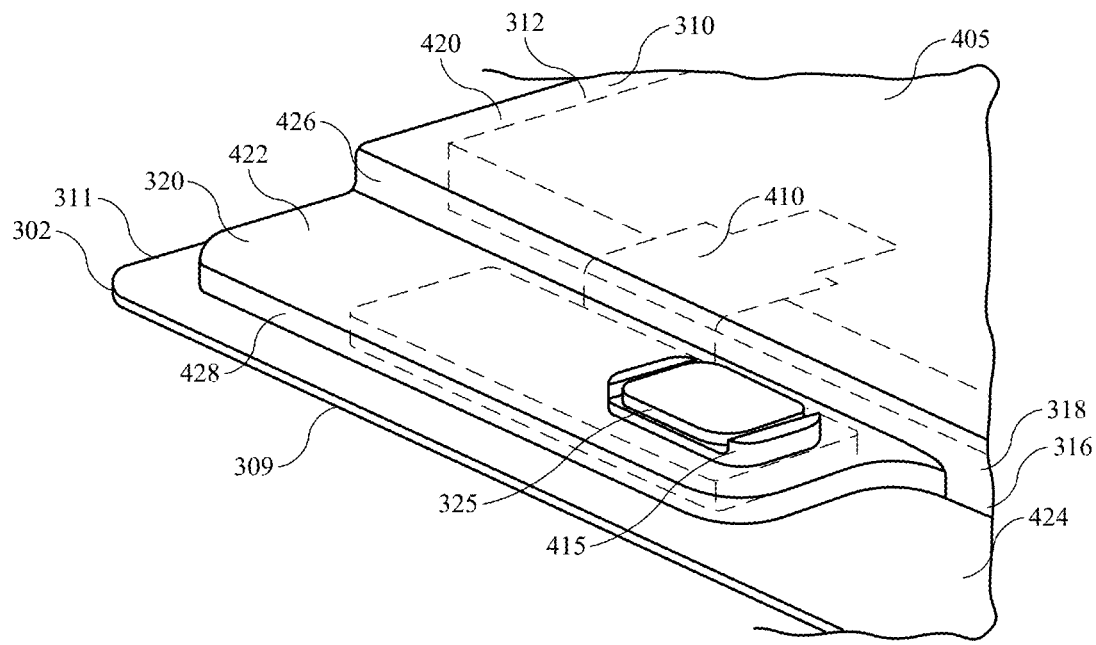
FIG. 4 shows a schematic, partial perspective view of a battery according to some embodiments of the present technology.

FIG. 4 shows a schematic, partial perspective view of battery 300 according to some embodiments of the present technology. FIG. 4 may include any of the features discussed previously, and may include a partial view within or through the housing of battery 300. As illustrated, the figure includes a partial view showing base 310 extending towards a corner of lateral edge 311 and lateral edge 309, and illustrating flange 302 extending about the battery 300. Through the housing, a battery cell 405 may be illustrated, and which is contained within an internal volume defined between the base 310 and lid as previously described. Additionally, battery cell 405 may include one or more battery cells as described previously. Battery cell 405 may be disposed within the largest depth within the cell defined by first surface 312, and may not extend past recessed ledge 318 of third surface 316, for example, and may not extend into the terraces. A conductive tab 410 may extend from the battery cell 405, and may extend through terrace 320 and to electrode terminal 325, which may be a terminal by which the battery may be coupled with a module or external device.

As illustrated, conductive tab 410 may be characterized by a partially arcuate shape, including an S-shape as illustrated, extending along an interior surface of the base. Additionally, the conductive tab 410 may be at least partially offset laterally from electrode terminal 325, and may include a lateral extension, which may be continuous, coupling the components electrically. Although only a first conductive tab is illustrated, it is to be understood that a similar conductive tab is similarly encompassed as being included similarly towards the opposite lateral edge 313, and extending into second terrace 322. A more symmetrical design may be accommodated in this way having similar conductive tabs extending from positive and negative electrodes of the battery cell 405 and extending into terraces 320, 322, where the conductive tabs may be accessed at electrode terminals 325 and 327 as previously described.

In some embodiments each of the first electrode terminal 325 and the second electrode terminal 327 may extend from the first surface 312 of battery 300 on terraces 320, 322 to the same position. In some embodiments, such as illustrated, first electrode terminal 325 may extend outward from first surface 312 of terrace 320 further than second electrode terminal 327, which may be a conductive pad accessible along the first surface 312 of terrace 322. As previously noted, in some embodiments the housing of battery 300 may be conductive and may be at the potential of one of the electrodes, such as the anode terminal, although the housing may also be maintained at cathode potential. The second electrode terminal 327 may represent the electrode terminal of the potential at which the housing is maintained. Accordingly, the terminal may be a contact, tab, or access of the housing. The first electrode terminal 325, however, may be at the opposite potential of the housing and/or the second electrode terminal 327, and may be maintained or electrically isolated from the rest of the housing. For example, first electrode terminal 325 may be the cathode terminal, although the terminal may also be maintained at anode potential in other embodiments.

Within battery 300 is cell material 405, which may be one or more battery cells as described previously. Conductive extension 410 may electrically couple one or more current collectors or electrodes with first electrode terminal 325. For example, in embodiments where first electrode terminal is a cathode terminal, conductive extension 410 may electrically couple cathode materials of cell material 405 with first electrode terminal 325. Spacer 415 may electrically insulate first electrode terminal 325 from the rest of the housing of battery 300 in embodiments where the housing may be at the opposite electrode potential. Both spacer 415 and first electrode terminal 325 may extend through the housing of battery 300, and extend from the first surface 312 of the battery 300 in a direction normal to the first surface of the battery along the terrace. To isolate the first electrode terminal 325 from the rest of the housing, spacer 415 may extend circumferentially about the first electrode terminal through the housing of battery 300, including along the first surface 312 along terrace 320 as illustrated. Consequently, first electrode terminal 325 may extend further than second electrode terminal 327. In order to limit the dimensions of a power module to accommodate this configuration, in some embodiments the module may include different conductive tabs to accommodate the spatial offset of the two terminals.

FIG. 4 may also show additional detail of the base structure 310 showing a tiered structure or profile along the base forming terraces 320 and 322 as well as a base position on which a module may be seated. For example, as illustrated, base 310 may define a first tier 420, which may define a depth of the battery, and may reside a furthest distance from the battery lid. Base 310 may also define a second tier 422 defining the first terrace 320 and second terrace 322. As shown with first terrace 320, the terrace may extend fully to a lip of first surface 312, which may be part of flange 302, such as one half of the flange, with the lid forming the other half of the flange from an opposite side. Base 310 may also form a third tier 424 extending inward from lateral edge 309 between first terrace 320 and second terrace 322. Third tier 424 may include a distance to recessed ledge 318 along a plane defining flange 302, which may produce a volume within which a module may be disposed. The tiered structure and formed terraces may similarly be characterized by recessed ledges formed along the base profile, which may include recessed ledge 318 extending between the terraces of the housing, and extending from first tier 420 to third tier 424.

Terrace 320, and similarly terrace 322, may be formed by a first recessed ledge 426 extending from first tier 420 to second tier 422, as well as a second recessed ledge 428 extending from second tier 422 to third tier 424. Accordingly, the first terrace and the second terrace may be defined along the exterior of the base, including along third surface 316, to a thickness or height from the second surface of the battery that is less than a thickness or height of the battery between the second surface and the first surface 312 at first tier 420, which may define the internal volume within which the battery cell 405 may be disposed. The second recessed ledge 428 may also define a profile of the terrace as illustrated, which may extend in an arcuate or angled direction back to recessed ledge 318, which may define each of the terrace lateral lengths as well as the volume between the terraces, such as the third tier 424. In some embodiments, each of the first terrace and the second terrace may extend from a lateral edge, including offset from the lateral edge by a length of the flange 302, to a distance towards a midpoint of the battery that is less than 40% of a lateral length of the battery from lateral edge 311 to lateral edge 313. In some embodiments, the terraces may extend a distance that is less than or about 30% of the lateral length, less than or about 25%, less than or about 20%, less than or about 15%, less than or about 10%, less than or about 5%, or less of the lateral length across the battery 300. This may provide a distance, and volume, that may at least partially be consumed by a module for the battery. For example, a module, such as a power module, may be seated on an exterior surface of base 310 along the third tier 424, and between the first terrace and the second terrace.

Figure 5:
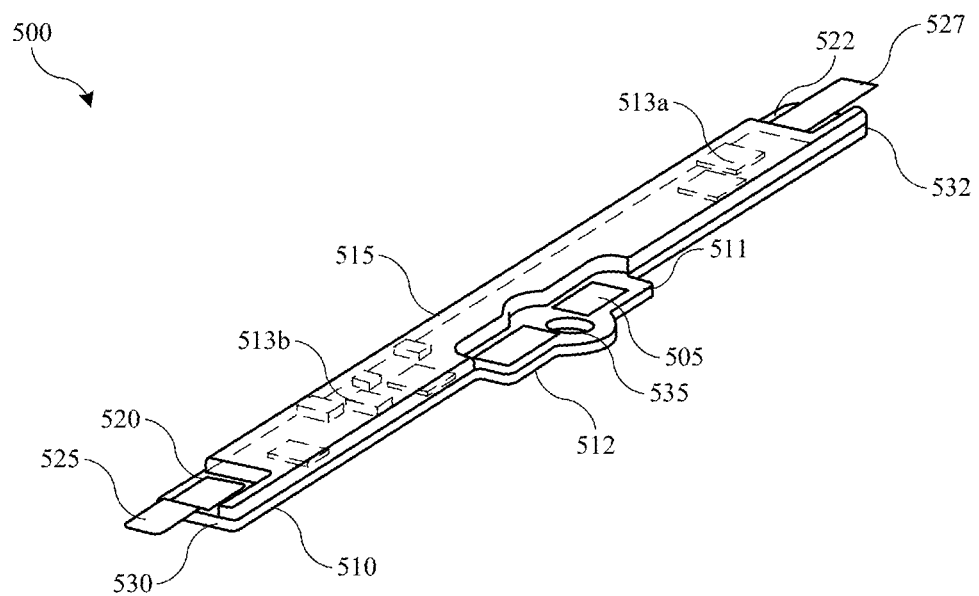
FIG. 5 shows a schematic perspective view of a battery module according to some embodiments of the present technology.

FIG. 5 shows a schematic perspective view of a battery module 500 according to some embodiments of the present technology. Module 500 may monitor and manage aspects of a battery operation, and may be a power control module in embodiments. Module 500 may electrically couple with electrode terminals of the battery, and may transfer power through connector 505, which may be any type of connector, such as a board-to-board connector, for example. Module 500 may include one or more components including a circuit board 510 as well as a mold 515, which may include a single mold extending along a first surface 511 of circuit board 510.

Circuit board 510 may include one or more electronic devices 513 or components extending from either or both of the first surface 511 or a second surface 512 of the circuit board opposite first surface 511, and which components are encapsulated by mold 515. For example, electronic device 513a and 513b are illustrated as extending from the first surface 511 of circuit board 510. The devices 513 are encapsulated by mold 515, which may provide protection for the electronic devices.

In some embodiments, module 500 may be limited to thicknesses or heights less than a few millimeters as previously described. However, module 500 may still be used to regulate and operate multiple aspects of a battery system, which may include larger electronic devices 513, such as FETs, resistors, sensors, or other components, which may be limited to particular heights that may extend beyond the provided envelope. However, because the module may be characterized by relatively longer lateral dimensions, in some embodiments additional components, such as a pair of any component, may be connected in series or parallel on circuit board 510 to provide the effect, while limiting the component size to accommodate the available volume.

Mold 515 may be characterized by one or more features to accommodate the components of the battery, such as battery 300 described previously, as well as the coupling of the module 500 with the battery. For example, mold 515 may define a first recess 520 extending towards a first lateral edge of module 500 and exposing a first conductive tab 525, which may extend laterally from a first lateral edge 530 of the module, such as an edge of circuit board 510. Mold 515 may also define a second recess 522 extending towards a second lateral edge of module 500 and exposing a second conductive tab 527, which may extend laterally from a second lateral edge 532 of the module, such as an opposite edge of circuit board 510 from the first lateral edge. Although mold 515 is illustrated as being flush with a front edge of module 500 where connector 505 extends, in some embodiments mold 515 may extend over the edge in a waterfall and extend in line with second surface 512 of circuit board 510.

Module 500 may include a connector 505 as noted above, and which may be located about or proximate a midpoint of the module, and may extend specifically across the midpoint of module 500 in some embodiments. Connector 505 may include contact pads as illustrated, which may be electrically and mechanically joined with a system board or other component of an electronic device in which components according to embodiments of the present technology may be included. Connector 505 may also include or define an aperture 535, which may facilitate locating and coupling the module with a system board or other component of an electronic device.

Figure 6:
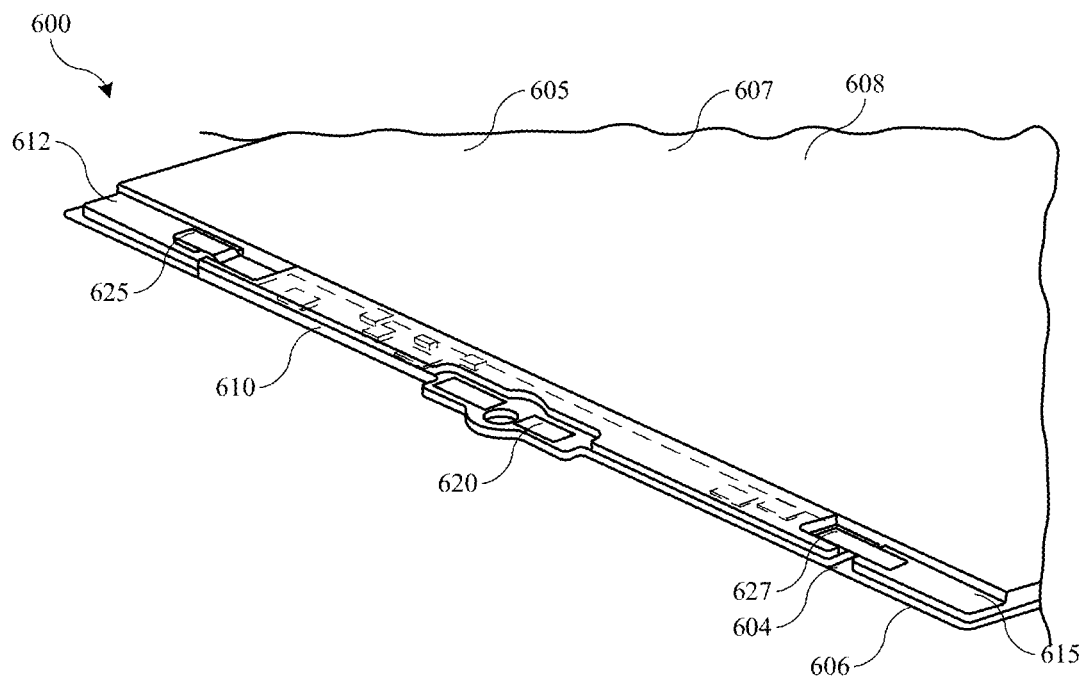
FIG. 6 shows a schematic partial perspective view of a battery system according to some embodiments of the present technology.

FIG. 6 shows a schematic partial perspective view of a battery system 600 according to some embodiments of the present technology, and may include a battery 605 and module 610 including any of the features or components previously described. When coupled with battery 605, which may include any features or characteristics of batteries described above, including battery 300, module 610 may be seated on battery base 607, including first surface 608, between a first terrace 612 and second terrace 615. For example, module 610 may be seated on a third tier as described previously, and components of module 610 may be maintained within a volume defined at least partially by or including a depth of battery 600, terraces 612 and 615, and a lateral edge 604 of battery 605, such as where flange 606 may extend. In some embodiments, connector 620 of module 610 may extend laterally beyond lateral edge 604 of battery 605 as illustrated, which may facilitate electrical connection with a system board or other component. In some embodiments, the extension beyond the lateral edge 604 may be limited to portions encompassing connector 620 as illustrated, and may not extend more than or about 20% of a distance along lateral edge 604 in either direction from a midpoint of battery 605. In some embodiments the amount of extension beyond lateral edge 604 may be less than or about 15% of a distance along the lateral edge, less than or about 10% of the distance, less than 5% of the distance, or less to minimize extension beyond the lateral dimensions of battery 605.

Module 610 may be electrically coupled with battery 605 at both the first electrode terminal and the second electrode terminal, which may reside on terraces 612 and 615 as previously described. As noted, module 610 may include a circuit board as well as a mold extending from a surface of the circuit board and encapsulating electronic components or devices, and which may be a surface opposite a surface with which the module is coupled with the battery 605, such as a third tier location formed by the base of the battery. A first conductive tab 625 and a second conductive tab 627 may be included on a first surface of the circuit board, and may extend from opposite lateral edges of the module as described previously to electrically couple the module 610 with the battery 605.

For example, first conductive tab 625 may extend from a first lateral edge of the module as previously described, and the first conductive tab 625 may extend laterally outward across the first terrace 612 of battery 605 at a lateral end of the first conductive tab, which may be electrically coupled with a first electrode terminal of the battery. Similarly, second conductive tab 627 may extend from a second lateral edge of the module as previously described, and the second conductive tab 627 may extend laterally outward across the second terrace 615 of battery 605 at a lateral end of the second conductive tab, which may be electrically coupled with a second electrode terminal of the battery.

As previously described, the first electrode terminal may extend outward from the housing with a spacer to electrically isolate the electrode terminal from the rest of the battery housing. Consequently, in some embodiments the first electrode terminal may be vertically offset from the second electrode terminal, which may be substantially flush with the second terrace 615. To accommodate this feature, as illustrated, first conductive tab 625 may extend in a direction normal to the surface of the terrace similar to the first electrode terminal. In this way, the lateral end of the first conductive tab 625 may be offset from the lateral end of the second conductive tab 627 in a direction parallel to the third surface of the battery, or normal to the first surface of the battery. Other than where connector 620 may extend beyond the lateral edge 604 of battery 605, module 610, may be otherwise contained within the third tier of the battery 605 in some embodiments. Accordingly, an upper surface of an overmold of the module may not extend above or beyond battery base 607 at an outermost portion of first surface 608.

Figure 7:
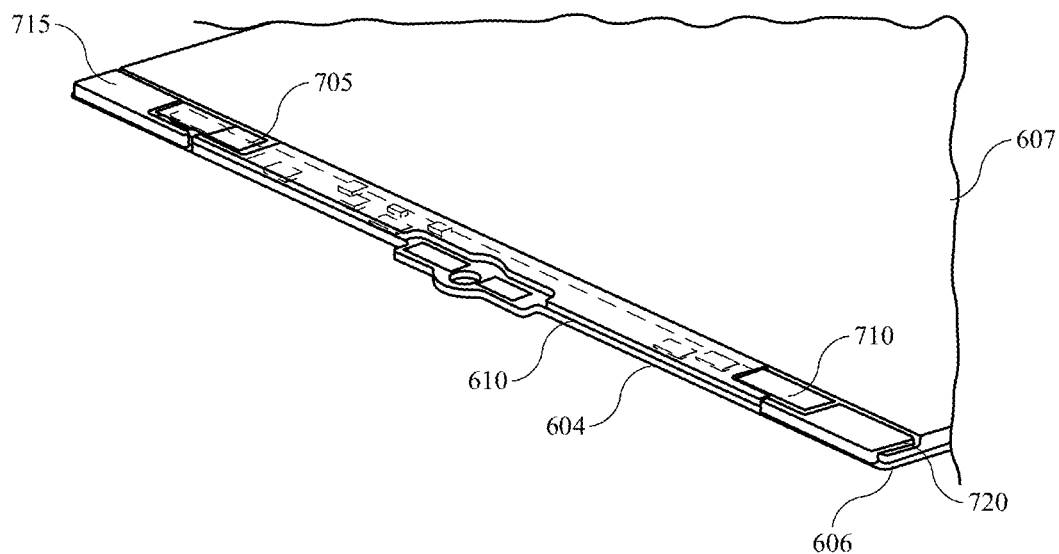
FIG. 7 shows a schematic partial perspective view of a battery system according to some embodiments of the present technology.

FIG. 7 shows a schematic partial perspective view of battery system 600 according to some embodiments of the present technology, and may illustrate additional packaging of the battery system. In some embodiments, an additional material may further insulate the first conductive tab and the second conductive tab on exposed surfaces, which may not be in direct contact with the battery electrode terminals, but which may be conductive. For example, an additional electrically insulative material may be used, such as a first insulative tape 705 positioned over the first conductive tab, and a second insulative tape 710 positioned over the second conductive tab. The insulative tape may be or include nylons, or more rigid materials may be included such as aramid polymer materials, including Nomex, or any other electrically insulative material may be used, for example, and may include any adhesive as will be further noted below.

An overmold of the module 610 as previously described may define a height of the module within the recess formed by battery base 607, and in some embodiments this height may extend up to or beyond a height of the first terrace and the second terrace. To produce a more flush surface across the terraces and overmold, a first spacer 715 may be positioned at least partially extending across the first terrace, and a second spacer 720 may be positioned at least partially extending across the second terrace. For example, the spacers may extend about the conductive tabs. Additionally, in some embodiments module 610 may extend across flange 606 along lateral edge 604 to extend substantially flush with the lateral edge 604.

To similarly produce a flush or substantially flush profile along lateral edge 604, first spacer 715 and second spacer 720 may additionally extend across the flange 606 along a surface towards lateral edge 604. Accordingly, the spacers may be characterized by a portion of the spacer that may extend over and along recessed ledges, such as second recessed ledges 428 as described above. By including the spacers, the first spacer, second spacer, and the overmold may all extend to a similar height or thickness along a third surface of the battery as noted above. Additionally, this height may be equal to or less than a height or thickness defined by base 607, such as along an area where a battery cell may be included within the housing as previously described. The overmold and/or circuit board may also be accommodated along lateral edge 604, and the first spacer, second spacer, and module 610 may extend to a similar lateral plane, including flush along lateral edge 604 as illustrated.

Figure 8A:
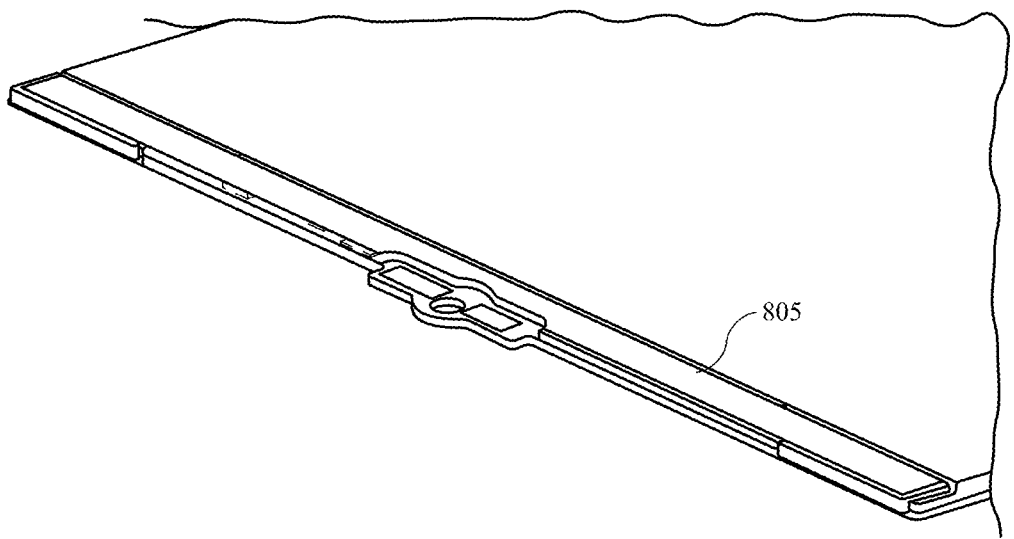
FIG. 8A shows a schematic partial perspective view of a battery system according to some embodiments of the present technology.

FIG. 8A shows a schematic partial perspective view of battery system 600 according to some embodiments of the present technology, and may illustrate additional packaging of the battery system. For example, an additional adhesive, such as a second insulative tape 805 may be extended across a first surface of the first spacer, the second spacer, and the overmold. This may further protect each of the components, and produce a more consistent profile across the components. As illustrated, second insulative tape 805 may extend similar to the components and extend flush with a lateral edge of the spacers and module along lateral edge 604, including flush with lateral edge 604 as illustrated. Additionally, the tape may also extend about the module and spacers as noted below.

Figure 8B:
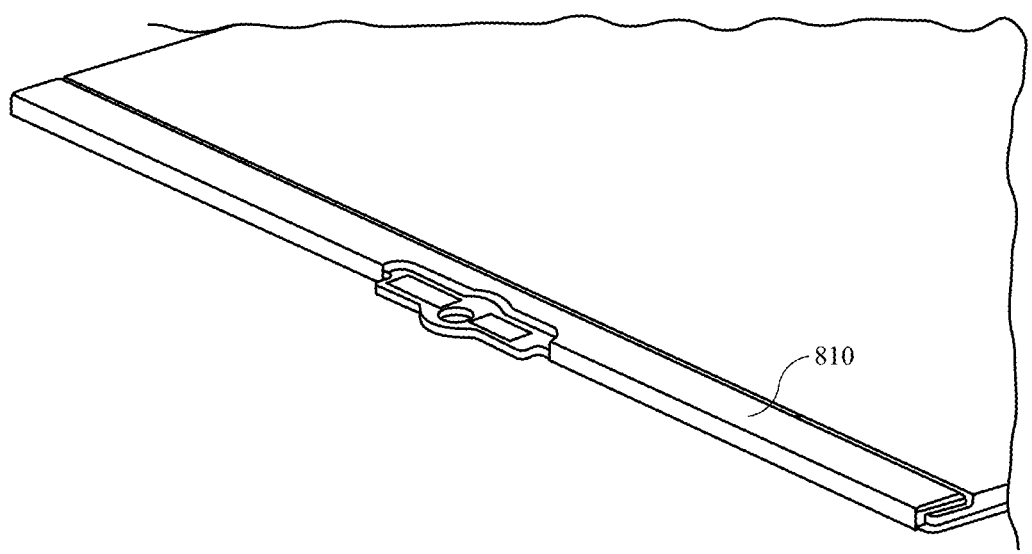
FIG. 8B shows a schematic partial perspective view of a battery system according to some embodiments of the present technology.

FIG. 8B shows a schematic partial perspective view of battery system 600 according to some embodiments of the present technology, and may illustrate an additional or alternative application of insulative tape, which may be second insulative tape 810. Similar to tape 805, second insulative tape 810 may be extended across a first surface of the first spacer, the second spacer, and the overmold as illustrated. Additionally, second insulative tape 810 may be folded about lateral edge 604 in some embodiments, and adhered to the battery lid, such as along the second surface of the battery as previously identified. Adhesive or tape 810, along with any of the adhesives tapes or encapsulant described elsewhere, may be any number of adhesives, and in some embodiments may provide environmental protection and/or insulation.

While in some embodiments the adhesives are water resistant, in other embodiments the adhesives may be configured to simply protect the components from any environmental contaminants including dust, lint, or other particulates, and insulate the components against contact. Additionally, the adhesives may be configured to maintain a location of the module 610 relative to the battery 605. The adhesives may be or include a polymer backing with an applied adhesive. The polymer may be any number of polymers that provide electrical resistivity, structural resiliency, hydrophobicity, or flexibility. For example, in some embodiments a polyimide-backed tape may be used, which may afford a thin film tape that may be flexible to accommodate the topography of module 610 and the first and second spacers, while limiting gaps or spacing about the module. Although described as a tape, additional adhesives, encapsulant, and enclosures may be utilized to provide a similar protection to components of the module 610, and are similarly encompassed by the present technology.

Battery systems according to embodiments of the present technology may provide a limited footprint extension for a control module associated with a battery, including batteries characterized by lateral dimensions one or two orders of magnitude greater than depth dimensions of the battery. Because many electronic devices have limited volume for a battery, the present technology allows more of this volume to be used for battery cell material, which may increase or maintain battery capacity in electronic devices. Additionally, modules according to the present technology may accommodate laterally seated electrode terminals of a battery by extending conductive tabs from outer edges of the module, which may also allow the module to be seated directly on an exterior surface of the battery, and be maintained within a volume defined by a profiled surface or multiple surfaces of the battery.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A battery system comprising:
    a battery including:
        a first surface,
        a second surface opposite the first surface,
        a third surface extending between the first surface and the second surface and at least partially defining a thickness of the battery between the first surface and the second surface,
        a recessed ledge defined by the third surface about a midpoint of the battery,
        a first terrace defined by the first surface and the third surface and formed proximate a first lateral edge of the first surface of the battery adjacent the third surface of the battery
        a second terrace formed proximate a second lateral edge of the first surface of the battery adjacent the third surface of the battery and opposite the first lateral edge, wherein the recessed ledge extends along the first surface of the battery between the first terrace and the second terrace; and
    a module seated on the first surface of the battery between the first terrace and the second terrace.

2. The battery system of claim 1, wherein the first terrace and the second terrace are defined along the third surface of the battery to a thickness from the second surface of the battery less than the thickness of the battery between the first surface of the battery and the second surface of the battery defining an internal volume of the battery within which a battery cell may be disposed.

3. The battery system of claim 1, wherein a first electrode terminal is accessible from the first surface of the battery along the first terrace, and wherein a second electrode terminal is accessible from the first surface of the battery along the second terrace.

4. The battery system of claim 3, wherein the first electrode terminal extends from the first surface of the battery in a direction normal to the first surface of the battery.

5. The battery system of claim 4, wherein a spacer extends about the first electrode terminal and electrically isolates the first electrode terminal from a housing of the battery.

6. The battery system of claim 1, wherein the module comprises electrical connections to the module proximate a midpoint of the module, and wherein the module extends laterally beyond an edge of the second surface of the battery proximate the midpoint of the module.

7. The battery system of claim 1, wherein the module further comprises:
    a first conductive tab extending from a first lateral edge of the module proximate the first terrace, wherein the first conductive tab extends laterally outward across the first terrace of the battery at a lateral end of the first conductive tab; and
    a second conductive tab extending from a second lateral edge of the module opposite the first lateral edge of the module and proximate the second terrace, wherein the second conductive tab extends laterally outward across the second terrace of the battery at a lateral end of the second conductive tab.

8. The battery system of claim 7, wherein the lateral end of the first conductive tab is offset from the lateral end of the second conductive tab in a direction parallel to the third surface of the battery.

9. The battery system of claim 7, further comprising a first insulative tape extending across the first conductive tab, and a second insulative tape extending across the second conductive tab.

10. The battery system of claim 1, wherein the module comprises a circuit board, wherein the module is seated against the first surface of the battery proximate a first surface of the circuit board, and wherein at least one electronic device extends from a second surface of the circuit board opposite the first surface of the circuit board.

11. The battery system of claim 10, wherein the module further comprises an overmold at least partially extending across the second surface of the circuit board and encapsulating the at least one electronic device.

12. The battery system of claim 11, further comprising:
    a first spacer at least partially extending across the first terrace, and
    a second spacer at least partially extending across the second terrace, wherein the first spacer, the second spacer, and the overmold extend to a similar thickness along the third surface of the battery less than or equal to the thickness of the battery between the first surface of the battery and the second surface of the battery.

13. The battery system of claim 12, further comprising a second insulative tape extending across the first spacer, the second spacer, and the overmold of the module.

14. The battery system of claim 13, wherein the second insulative tape is folded about the module, and wherein the second insulative tape is adhesively coupled along the second surface of the battery.

* * * * *